United States Patent
Richardson, III et al.

(10) Patent No.: US 8,607,928 B2
(45) Date of Patent: Dec. 17, 2013

(54) COMPOSITE FLAME BARRIER LAMINATE FOR A THERMAL AND ACOUSTIC INSULATION BLANKET

(75) Inventors: Llewellyn Bentley Richardson, III, Chesterfield, VA (US); Dariusz Wlodzimierz Kawka, Midlothian, VA (US)

(73) Assignee: E I du Pont de Nemours and Company, Wilmington, DE (US)

( * ) Notice: Subject to any disclaimer, the term of this patent is extended or adjusted under 35 U.S.C. 154(b) by 11 days.

(21) Appl. No.: 13/325,804

(22) Filed: Dec. 14, 2011

(65) Prior Publication Data

US 2012/0321883 A1 Dec. 20, 2012

Related U.S. Application Data

(63) Continuation-in-part of application No. 12/759,741, filed on Apr. 14, 2010, now Pat. No. 8,292,027.

(60) Provisional application No. 61/171,163, filed on Apr. 21, 2009.

(51) Int. Cl.
*E04B 1/84* (2006.01)
*C08J 7/04* (2006.01)
*B32B 3/10* (2006.01)
*B32B 7/02* (2006.01)

(52) U.S. Cl.
USPC ........... 181/294; 428/138; 428/212; 428/213; 428/216; 428/341

(58) Field of Classification Search
USPC ........... 181/294; 428/138, 212, 213, 216, 341
See application file for complete search history.

(56) References Cited

U.S. PATENT DOCUMENTS

| | | | | |
|---|---|---|---|---|
| 3,346,219 A | * | 10/1967 | Salyer et al. | 244/114 R |
| 3,841,954 A | * | 10/1974 | Lawler | 428/102 |
| 4,698,267 A | * | 10/1987 | Tokarsky | 428/474.4 |
| 4,729,921 A | * | 3/1988 | Tokarsky | 428/326 |
| 4,810,565 A | * | 3/1989 | Wasitis et al. | 428/215 |
| 5,026,456 A | * | 6/1991 | Hesler et al. | 162/146 |
| 5,084,136 A | * | 1/1992 | Haines et al. | 162/9 |
| 5,223,094 A | * | 6/1993 | Kirayoglu et al. | 162/145 |
| 5,314,742 A | * | 5/1994 | Kirayoglu et al. | 442/378 |
| 6,322,022 B1 | * | 11/2001 | Fay et al. | 244/121 |
| 6,565,040 B2 | * | 5/2003 | Fay et al. | 244/121 |
| 6,627,561 B1 | * | 9/2003 | Wulliman et al. | 442/1 |
| 6,670,291 B1 | * | 12/2003 | Tompkins et al. | 442/136 |
| 2004/0211506 A1 | * | 10/2004 | Wang et al. | 156/89.11 |
| 2007/0155265 A1 | * | 7/2007 | Anderson | 442/35 |

(Continued)

OTHER PUBLICATIONS

Khang D. Tran, Light Weight Fire Barrier Materials for Aircraft Fuselage Thermal/ Acoustical Insulation; The Mexmil Company, Santa Ana, California, USA.

*Primary Examiner* — David Warren
*Assistant Examiner* — Christina Russell

(57) ABSTRACT

A multilayer laminate for use as a flame barrier in an aircraft comprising a polymeric film layer capable of withstanding a temperature of at least 200 C for at least 10 min, an adhesive layer, an inorganic refractory layer and an aramid paper comprising from 50 to 90 weight percent of aramid fibers and from 10 to 50 weight percent of meta-aramid binder.

11 Claims, 1 Drawing Sheet

(56) References Cited

U.S. PATENT DOCUMENTS

| | | | |
|---|---|---|---|
| 2010/0024969 A1* | 2/2010 | Wang et al. | 156/239 |
| 2010/0159221 A1* | 6/2010 | Kourtakis et al. | 428/216 |
| 2010/0173152 A1* | 7/2010 | Beraud et al. | 428/361 |
| 2010/0209679 A1* | 8/2010 | Tompkins | 428/201 |
| 2011/0094826 A1* | 4/2011 | Richardson et al. | 181/294 |
| 2011/0114342 A1* | 5/2011 | Ono et al. | 169/45 |
| 2012/0003451 A1* | 1/2012 | Weigel et al. | 428/213 |
| 2012/0128959 A1* | 5/2012 | Fernando et al. | 428/219 |
| 2012/0321848 A1* | 12/2012 | Richardson, III et al. | 428/138 |
| 2012/0321849 A1* | 12/2012 | Richardson et al. | 428/138 |
| 2012/0321868 A1* | 12/2012 | Richardson et al. | 428/216 |
| 2012/0321883 A1* | 12/2012 | Richardson et al. | 428/341 |

* cited by examiner

COMPOSITE FLAME BARRIER LAMINATE FOR A THERMAL AND ACOUSTIC INSULATION BLANKET

This application is a continuation in part of application Ser. No. 12/759,741 filed on Mar. 14, 2010 which claims priority from provisional filing application No. 61/171,163 filed on Apr. 21, 2009.

BACKGROUND OF THE INVENTION

1. Field of Invention

This invention pertains to a composite laminate having flame resistant properties. The invention also covers use of the composite laminate in a thermal and acoustic blanket as may be found in an aircraft fuselage or a turbine engine compartment.

2. Background of the Invention

U.S. Pat. No. 6,322,022 to Fay et al. discloses burnthrough resistant systems for transportation especially aircraft.

U.S. Pat. No. 6,670,291 to Tomkins and Vogel-Martin describes a laminate sheet material for fire barrier layer applications.

There remains an ongoing need for thermal and acoustic blankets for aircraft structures having reduced weight and improved resistance to flame spread.

SUMMARY OF INVENTION

This invention is directed to a multilayer laminate for use as a flame barrier in an aircraft comprising:
(i) a polymeric film layer capable of withstanding a temperature of at least 200 C for at least 10 min,
(ii) an adhesive layer having an areal weight of from 2 to 40 gsm capable of activation at a temperature of from 75 to 200 degrees C.,
(iii) an inorganic refractory layer, and
(iv) aramid paper comprising from 50 to 90 weight percent of aramid fibers and from 10 to 50 weight percent of meta-aramid binder.

DETAILED DESCRIPTION OF THE INVENTION

Figure 1:
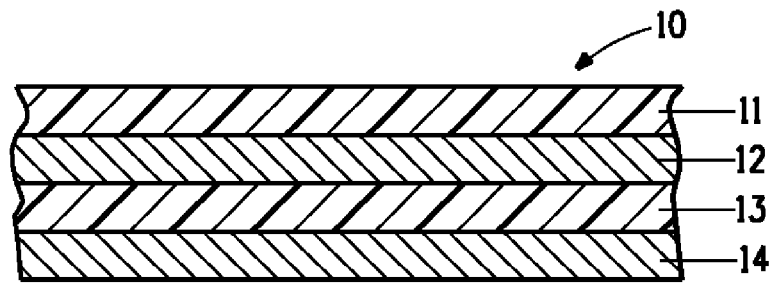
FIG. 1 is a schematic cross section through a composite laminate of this invention.

FIG. 1 shows a section through a composite laminate 10 comprising a polymeric film layer 11, an adhesive layer 12, an inorganic refractory layer 13 and an aramid paper layer 14.

Polymeric Film Layer

The polymeric film layer must be capable of withstanding a temperature of at least 200 C for at least 10 min. The film layer may be a thermoset or thermoplastic material. A thermoplastic film is preferred.

Preferably the film layer should have a UL 94 flame classification of V-0. UL 94 flame classification is an Underwriters Laboratory test, The Standard for Flammability of Plastic Materials for Parts in Devices and Appliances, which measures a material's tendency either to extinguish or to spread the flame once the specimen has been ignited. V-0 indicates that the material is tested in a vertical position and self-extinguished within ten seconds after the ignition source is removed.

A further requirement of the film layer is that it should have a thickness in the range of from 4 to 30 micrometers. More preferably the thickness range should be from 5 to 15 micrometers and most preferably in the range from 5 to 7 micrometers. The film layer provides mechanical strength and stiffness to the laminate.

Suitable film layer materials are polyketone, polyimide, polysulfone, polyarylene sulfide, fluoropolymers, liquid crystal polymers and polycarbonate. Examples of polyketone are polyetheretherketone (PEEK) and polyetherketoneketone (PEKK). Polyethersulfone and polyphenylsulfone are examples of polysulfone. Poly(p-phenylene sulfide is a suitable polyarylene sulfide for use in this invention. Polyvinylfluoride (PVF) and polyvinylidinefluoride (PVDF) are examples of fluoropolymers. A suitable fluoropolymer is available from E.I. du Pont de Nemours, Wilmington, Del. under the tradename Tedlar. Polyarylate is an example of a suitable liquid crystal polymer. Some of these films may also be coated with a second polymeric material. For example, a polyimide film, Kapton®, may be coated with fluorinated ethylene propylene, FEP and used in this invention.

In a preferred embodiment, the film layer is PEEK or PEKK.

The surface of the film layer may optionally be treated to improve adhesion with another substrate such as an adhesive. Suitable surface treatment methods include, but are not limited to, corona etching and washing with coupling agents such as ammonium, phosphonium or sulfonium salts.

In some embodiments, the film layer is metalized on at least one surface. In some embodiments, the metalized surface is in contact with the adhesive layer.

Adhesive Layer

The adhesive layer is located between the polymeric film layer and the refractory layer. It is shown at 12 in FIG. 1.

The adhesive layer may be a thermoplastic or thermoset resin. Thermoset resins include epoxy, epoxy novolac, phenolic, polyurethane, and polyimide. Thermoplastic resins include polyester, polyetherketone, polyetheretherketone, polyetherketoneketone, polyethersulfone, and polyolefin. Thermoplastic resins are preferred.

One of the objectives for having a high temperature polymeric film adhesively bonded to a refractory layer is to provide mechanical reinforcement and protection to the overall composite laminate during manufacturing, installation and service.

To prevent possible damage from mechanical stressing exerted by a shrinking/melting/disintegrating polymeric film on an inorganic refractory film-like layer it is preferred that inter-ply bond of the composite laminate would fail (i.e. release/melt/soften) in the early stage of the flame exposure causing internal de-bonding of the composite laminate (i.e delamination of the refractory layer from the polymeric film) before the polymeric film starts disintegrating. Due to their relatively low activation temperatures, thermoplastic adhesives are a preferred choice over thermoset adhesives for this application.

The adhesive layer may optionally contain up to 40 weight percent of a flame retardant ingredient. Suitable flame retardant ingredients include antimony trioxide, halogenated flame retardants including tetrabromobisphenol A, polybrominated biphenyls, Penta-, Octa-, Deca-brominated diphenyl ether (oxide) and hexabromocyclododecane. Phosphorus containing flame retardants are also widely used.

The adhesive must be capable of activation at a temperature in the range of 75 to 200 degrees C. In some embodiments, the activation range is from 120 to 140 degrees C. By activation we mean that for a thermoset resin, the resin must bond to the polymeric film layer and the refractory layer within the specified temperature range. For a thermoplastic resin, activation means that the resin softens and flows sufficiently to bond to the polymeric film layer and the refractory layer. The adhesive bond between the inorganic refractory layer and the polymeric film is at least 0.25 lb/in. In some embodiments, the adhesive bond between the inorganic refractory layer and the polymeric film is at least 0.8 lb/in.

The adhesive layer weighs from 2 to 40 gsm. In some embodiments the adhesive layer weighs from 3 to 15 gsm or even from 5 to 10 gsm. If the adhesive weight is below 2 gsm, the bond strength will be too weak. If the adhesive weight is greater than 40 gsm, unnecessary weight will be added.

Refractory Layer

The inorganic refractory layer is on the opposite side of the adhesive layer from the polymeric film layer as is shown at 13 in FIG. 1.

The refractory layer has a dry areal weight of from 15 to 50 gsm and a residual moisture content of no greater than 10 percent by weight, In some embodiments, the refractory layer has a dry areal weight of from 20 to 35 gsm and a residual moisture content of no greater than 3 percent by weight.

The refractory layer comprises platelets. Preferably at least 85% of the layer comprises platelets, more preferably at least 90% and most preferably at least 95%. In some embodiments, platelets comprise 100% of the layer. The refractory layer may comprise some residual dispersant arising from incomplete drying of the platelet dispersion during manufacture.

In some embodiments, the refractory layer has a thickness of from 7.0 to 76 micrometers and more preferably from 7.0 to 50 micrometers. In some embodiments, the refractory layer has a UL 94 flame classification of V-0. The function of the refractory layer, in which adjacent platelets overlap, is to provide a flame and hot gas impermeable barrier. The inorganic platelets may be clay, such as montmorillonite, vermiculite, mica, talc and combinations thereof. Preferably, the inorganic oxide platelets are stable (i.e., do not burn, melt or decompose) at about 600 degrees C., more preferably at about 800 degrees C. and most preferably at about 1000 degrees C. Vermiculite is a preferred platelet material. Vermiculite is a hydrated magnesium aluminosilicate micaceous mineral found in nature as a multilayer crystal. Vermiculite typically comprises by (dry) weight, on a theoretical oxide basis, about 38-46% $SiO_2$, about 16-24% MgO, about 11-16% $Al_2O_3$, about 8-13% $Fe_2O_3$ and the remainder generally oxides of K, Ca, Ti, Mn, Cr, Na, and Ba. "Exfoliated" vermiculite refers to vermiculite that has been treated, chemically or with heat, to expand and separate the layers of the crystal, yielding high aspect ratio vermiculite platelets. Suitable vermiculite materials are available from W. R. Grace of Cambridge, Mass., under the trade designations MicroLite 963 and MicroLite HTS-XE.

The thickness of an individual platelet typically ranges from about 5 Angstroms to about 5,000 Angstroms more preferably from about 10 Angstroms to about 4,200 Angstroms. The mean value of the maximum width of a platelet typically ranges from about 10,000 Angstroms to about 30,000 Angstroms The aspect ratio of an individual platelet typically ranges from 100 to 20,000.

In some embodiments of this invention, the inorganic platelet layer is reinforced by a lightweight open weave fabric scrim either laid onto a single platelet layer or placed between two layers of platelets so as to provide additional mechanical strength to the layer. The scrim can be made from natural, organic or inorganic fibers with glass, cotton, nylon or polyester being typical examples. A glass fiber scrim is particularly preferred. The scrim may be a woven or knit structure and has a typical areal weight not exceeding 40 grams per square meter.

In some embodiments, the refractory layer is perforated to enhance bonding to the adhesive layer. With a perforated refractory layer, the adhesive bond between the refractory layer and the polymeric film is at least 1.0 lb/in. The extent of perforation is determined by experimentation for each laminate assembly. In order to prevent compromising flame barrier properties, an individual perforation should not exceed 2 millimeters in maximum dimension. In a preferable embodiment, individual perforations should be spaced at least 10 millimeters apart. The shape of the perforations is not critical, Suitable perforations include circles, squares, rectangles, ovals and chevrons.

A refractory layer comprising platelets as herein described provides a nonporous, flexible, film-like sheet or coating. The platelet layer is also thin, dense and has a very smooth and tough surface, attributes that assist in the heat sealing process when the laminate comprising the refractory layer is used in a thermal blanket. A refractory layer comprising ceramic fibers is much more porous, brittle, and friable.

In a preferred embodiment, the refractory layer further comprises cations arising from contact, at a temperature of from 10 to 50 degrees C., with an aqueous cationic rich solution at a cation concentration of from 0.25 to 2N. The contact with the cationic solution occurs prior to assembling the refractory layer into the composite laminate. This cationic treatment provides enhanced stability to the refractory layer on exposure to fluids.

Aramid Paper Layer

In one embodiment, the aramid paper comprises from 50 to 90 weight percent of aramid fibers and from 10 to 50 weight percent of binder. A preferred binder is meta-aramid.

The thickness of the paper used in this invention is dependent upon the end use or desired properties of the laminate but is typically from 3 to 20 mils (75 to 500 micrometers) thick. In some embodiments, the basis weight of the paper is from 0.5 to 6 ounces per square yard (15 to 200 grams per square meter).

The aramid fibers of the paper can be in the form of floc, pulp, or a combination of thereof. As employed herein the term aramid means a polyamide wherein at least 85% of the amide (—CONH—) linkages are attached directly to two aromatic rings. Additives can be used with the aramid. In fact, it has been found that up to as much as 10 percent, by weight, of other polymeric material can be blended with the aramid or that copolymers can be used having as much as 10 percent of other diamine substituted for the diamine of the aramid or as much as 10 percent of other diacid chloride substituted for the diacid chloride of the aramid.

Floc is generally made by cutting continuous spun filaments into specific-length pieces. If the floc length is less than 2 millimeters, it is generally too short to provide a paper with adequate strength; if the floc length is more than 25 millimeters, it is very difficult to form uniform wet-laid webs. Floc having a diameter of less than 5 micrometers, and especially less than 3 micrometers, is difficult to produce with adequate cross sectional uniformity and reproducibility; if the floc diameter is more than 20 micrometers, it is very difficult to form uniform papers of light to medium basis weights.

The term "pulp", as used herein, means particles of fibrous material having a stalk and fibrils extending generally therefrom, wherein the stalk is generally columnar and 10 to 50 micrometers in diameter and the fibrils are fine, hair-like members generally attached to the stalk measuring only a fraction of a micrometer or a few micrometers in diameter and 10 to 100 micrometers long. Aramid fiber floc is of a similar length to carbon fiber floc. Both meta and para aramid fibers are suitable and are available from E.I. DuPont de Nemours, Richmond, Va. under the tradenames Kevlar® and Nomex® and from Teijin Twaron, Conyers, Ga. under the tradename Twaron®.

A preferred pulp material is p-aramid. However a blend of p-aramid with other synthetic or natural fibers such as liquid crystal polyester, polyareneazole, meta-aramid, and cellulose can be utilized. One illustrative process for making aramid pulp is disclosed in U.S. Pat. No. 5,084,136 to Haines et al.

Different thermoset and thermoplastic resins can be used as a polymeric binder in the paper of this invention. These resins can be supplied in the form of fibrids, flakes, powder, and floc. The term "fibrids" as used herein, means a very finely-divided polymer product of small, filmy, essentially two-dimensional, particles known having a length and width of 100 to 1000 micrometers and a thickness of 0.1 to 1 micrometer. Preferable types of binder resins are aramids, polyimides, phenolics, and epoxies. However, other types of the resins can also be used.

Fibrids are typically made by streaming a polymer solution into a coagulating bath of liquid that is immiscible with the solvent of the solution. The stream of polymer solution is subjected to strenuous shearing forces and turbulence as the polymer is coagulated. The fibrid material of this invention can be selected from meta or para-aramid or blends thereof. More preferably, the fibrid is a meta-aramid.

The paper can include small amounts of inorganic particles including mica, vermiculite, and the like; the addition of these performance enhancing additives being to impart properties such as improved fire resistance, thermal conductivity, dimensional stability, and the like to the paper and the final laminate.

In one preferred embodiment, the fiber and the polymer binder in the form of fibrids can be slurried together to form a mix that is converted to paper on a wire screen or belt. Reference is made to U.S. Pat. Nos. 4,698,267 and 4,729,921 to Tokarsky; U.S. Pat. No. 5,026,456 to Hesler et al.; U.S. Pat. Nos. 5,223,094 and 5,314,742 to Kirayoglu et al for illustrative processes for forming papers from aramid fibers and aramid fibrids.

Once the paper is formed, it may be calendered to the desired void content/apparent density.

Flame Barrier

The composite laminate as described above may be used as a flame barrier layer. Flame barrier layers find use in applications in vehicles or building structures such as aircraft, trains, boats and offshore rigs where the fire barrier layers may be found in ceiling, sidewall and floor panels. For aircraft, other uses are in cargo liners and thermal acoustic blankets.

Thermal Acoustic Blanket

Figure 2:
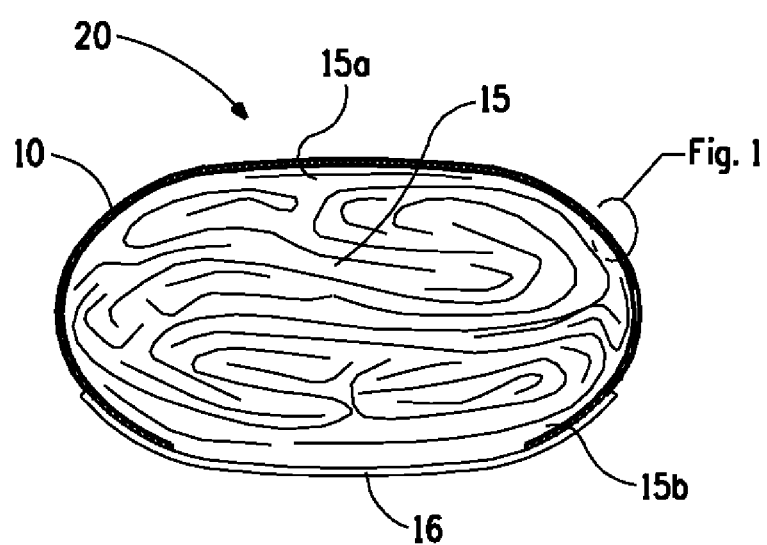
FIG. 2 is a cross section of a thermal and acoustic blanket comprising a composite flame barrier laminate of this invention.

The flame barrier as described above may be used as a component in a thermal insulation and acoustic blanket. An example of such a blanket is described in United States Patent Application publication number 2007/0155265 to Anderson. FIGS. 2 and 3 of this publication show at 16 a flame-retardant barrier layer. The flame barrier layer of this invention could replace the flame barrier layers described in the Anderson publication.

FIG. 2 depicts at 20 another embodiment in which a thermal and acoustic blanket 20 comprises an inorganic or organic core of fibrous batting 15 having a first outer surface 15a and a second outer surface 15b. The core has a self-extinguishing time no greater than 10 seconds and a maximum burn length of no greater than 102 mm when tested in accordance with BSS7230 Method F1. A composite laminate 10 as previously described and as depicted in FIG. 1 covers the first outer surface of the core and partially covers the second outer surface. The laminate is positioned over the core such that the aramid paper component 14 is adjacent to the core and the polymeric film component 11 is furthest away from the core. A high temperature resistant backing film 16 covers that portion of the core not covered by the laminate. The backing film 16 overlaps the laminate and is bonded to the polymeric film component 11 of the laminate in the region of the overlap.

In a further embodiment, the surface of the aramid paper not in contact with the refractory layer is bonded to a scrim reinforcement fabric with a fire retardant (FR) heat seal adhesive. In this structure, the reinforcement fabric covers the first outer surface of the core and partially covers the second the outer surface. Suitable scrim reinforcement materials include, but are not limited to, nylon, aramid and fiberglass.

The high temperature resistant polymeric backing film 16 may be thermoset or thermoplastic. Thermoplastic films are preferred. Preferably the film is inherently flame resistant that is, it will not propagate fire when exposed to flame. Suitable polymers for the film include polyketone, polyimide, polysulfone, polyarylene sulfide, fluoropolymers, liquid crystal polymers and polycarbonate. Examples of polyketone are polyetheretherketone (PEEK) and polyetherketoneketone (PEKK). Polyethersulfone and polyphenylsulfone are examples of polysulfone. Poly(p-phenylene sulfide is a suitable polyarylene sulfide for use in this invention. Polyvinylfluoride (PVF) and polyvinylidinefluoride (PVDF) are examples of fluoropolymers. A suitable fluoropolymer is available from E.I. du Pont de Nemours, Wilmington, Del. under the tradename Tedlar. Polyarylate is an example of a suitable liquid crystal polymer. Some of these films may also be coated with a second polymeric material. For example, a polyimide film, Kapton®, may be coated with fluorinated ethylene propylene, FEP and used in this invention.

In a one embodiment, the film layer is PEEK or PEKK. In a further embodiment, the high temperature polymeric backing film is reinforced by a scrim fabric in a similar manner to the aramid paper such that the reinforcement fabric partially covers the second the outer surface of the core. Suitable scrim reinforcement materials include, but are not limited to, nylon, aramid and fiberglass.

The blanket is placed against the interior skin of an aircraft fuselage with the surface of the blanket comprising the backing film 16 furthest away from the fuselage.

It is a requirement for the composite flame barrier laminate 10 to meet the following flammability requirements. In a vertical test (60 seconds ignition), when tested according to Federal Aviation Regulation, Section 25, Appendix F, Part 1, the composite flame barrier laminate 10 must be self-extinguishing in no greater than 10 seconds and must have a maximum burn length of no greater than 102 mm. In a 45 Degree Angle Test, when tested according to BSS7230, the self-extinguishing time must be no greater than 5 seconds and the afterglow no greater than 10 seconds.

The core may be foam or an organic or inorganic fibrous material. A suitable foam material is polyimide available under the tradename INSULMIDE from Johns Manville Insulations Group, Denver, Co. or SOLIMIDE from Inspec Foams, Allen, Tex. Suitable non-metallic fibers include, but are not limited to, glass fibers, aramid fibers, crystalline ceramic oxide (including quartz) fibers, silicon nitride fibers, silicon carbide fibers, oxidized polyacrylonitrile fibers, carbon fibers, and combinations thereof.

Glass fiber is a preferred material with E-glass, a low alkali borosilicate glass, being particularly suitable. Ceramic oxide materials are typically metal oxides that have been consolidated by the action of heat. Ceramic oxide fibers generally refer to a class of fibers typically containing one or more oxides of aluminum, silicon, and boron. Many other additives may also be present (e.g., oxides of sodium, calcium, magnesium, and phosphorus) within the fibers, although the fibers include primarily metal oxides. Typically, the ceramic oxide fibers are crystalline ceramics and/or a mixture of crystalline ceramic and glass (i.e., a fiber that contains both crystalline ceramic and glass phases). Preferred ceramic oxide fibers are aluminosilicate, aluminoborosilicate, and alumina fibers, and may be in the form of yarns or in the form of staple fibers. The preferred form of non-metallic fiber is a batting which is a soft bulky assembly of fibers, usually carded. Battings have a typical density range of from 5.5 to 24.0 kg./m$^3$. Suitable glass batting is available under the MICROLITE AA tradename from Johns Manville OEM Insulations Division, Denver, Co. The core may comprise more than one layer of material. The materials in different layers of the core need not be the same.

Test Methods

The 4-layer composite laminates were subjected to a flame test that replicated the temperature and air mass flux test conditions of test method FAA FAR 25.856(b), App. F, Part VII. Somewhat lower heat flux was compensated with a higher air mass flux to replicate a required thermo-mechanical stress level to be exerted on the composite flame barrier laminates during the burn-through test.

EXAMPLES

All parts and percentages are by weight unless otherwise indicated. All temperatures are in degrees C. unless otherwise indicated.

Inorganic Refractory Material

The inorganic refractory material used in all the examples was vermiculite. The vermiculite grade was a high solids version of an aqueous dispersion of Microlite® 963 having an as supplied solids content of 7.5 percent. The dispersion was obtained from W.R. Grace and Co, Cambridge, Mass. The vermiculite dispersion used in all the Examples was concentrated to a solids content of 10.6 weight percent.

Aramid Paper

The paper used in all the examples was T413 grade Nomex® from DuPont. The paper had a basis weight of 1.23 oz/sq. yd., an average thickness of 4.9 mil, a density of 0.34 ccm, a Gurley Air Resistance of 316 sec/100 cc, 20 oz. cyl., a smoothness of 325 Sheffield units, a dry tensile strength of 10.7 lb./in. in a first (machine) direction and 5.5 lb./in. in a second (cross) direction. The wet tensile strength was 5.1 lb./in. in a first (machine) direction and 2.95 lb./in. in a second (cross) direction.

Polymeric Film

The polymeric film used in all examples was a 6 micron thick polyetheretherketone (PEKK) film grade DS-E obtained from Cytec Industries, Woodland Park, N.J.

Adhesive

The adhesive used in all examples was Bostik LADH 402, a solvent-based polyamide fire retardant thermoplastic liquid adhesive obtained from Bostik Inc., Wauwatosa, Wis.

Lamination Equipment

For all Examples, a flat-bed double-belt laminator with a Teflon coated fiberglass belt was used to form the composite laminates. The lamination temperatures in the 9 foot long pre-nip heating section were 70 to 90 degrees in zone 1, 90 to 110 degrees in zone 2 and 130 to 150 degrees in zone 3.

The lamination temp in the 3 foot long post-nip cooling section was 50 to 70 degrees in zone 4.

The force applied by the belt on a sample size of 400 square centimeters was 5 kN. The machine line speed was 2 m/min.

Preparation of the Inorganic Refractory Layer on Aramid Paper

Vermiculite dispersion concentrated to a solids content of 10.6% weight percent was coated on the T413 paper using a slot die coating system to form a refractory layer on the paper.

The coated paper was dried for 15 minutes in an air flotation oven at a temperature not exceeding 110 degrees C. until the inorganic refractory layer had moisture content below 5%. Differential drying temperatures were applied to the top (vermiculite side) and the bottom (release paper side). The drying profile on the top side was 5 minutes at 49 degrees, 5 minutes at 60 degrees and 5 minutes at 71 degrees. The drying on the bottom side was maintained for 15 minutes at 99 degrees. The refractory layer had a dry coat weight of 37 gsm. The two layer composite of paper and refractory layer was wound up on a roll.

Example 1

In this example, the 2-layer flame barrier composite comprising the refractory layer on an aramid paper was adhesively bonded to PEKK film to form a 4-layer composite laminate.

The adhesive was deposited on the surface of the PEKK film using a Gardco Adjustable Micrometer "Microm II" Film Applicator. After deposition, the coated film was dried in a conventional oven at 80 degrees for 10 minutes to allow the solvent in the adhesive to evaporate. The dry weight of the adhesive deposited on the polymeric film was 8 gsm.

The dry adhesive coated film was then bonded to the refractory layer on an aramid paper in the double-belt laminator, with the dry adhesive contacting the exposed refractory surface to form 4-layer composite laminate.

The 4-layer composite was subjected to the flame test. When exposed to a flame on the polymeric film side, the sample showed a good resistance to flame propagation, with inorganic refractory layer acting as an effective flame barrier. The Nomex® paper prevented propagation of the fire.

Example 2

This was as Example 1 except that, after coating and drying, a 2-layer composite comprising inorganic refractory layer on an aramid paper was treated, at ambient conditions, with an aqueous cationic rich solution.

The coated release paper was immersed for one minute in a cation rich solution of sodium chloride dispersed in water at 0.5N concentration then air dried at 24 degrees C. for 2 minutes followed by additional drying for 30 minutes inside a conventional oven heated to 80 degrees C.

Once dried to about 3% moisture content, the cation treated material was removed from the oven. Excess dry sodium chloride that had accumulated on the outer surfaces of the refractory layer and the release paper was carefully wiped off with a dry soft cloth.

The cation treated 2-layer composite comprising refractory layer on an aramid paper was then adhesively bonded to PEKK film to form a 4-layer laminate in the same manner as Example 1.

When compared to the non-cation treated refractory layer of Example 1, the cation treated layer showed a significantly improved stability when exposed to either high humidity conditions for a prolonged time such as 120 hours inside an aging chamber at 80 degrees C. and 90% RH or after immersion in water for at least 10 minutes. Other findings were similar to those of Example 1.

Example 3

This was as Example 2 except that potassium chloride was used to make the aqueous cationic rich solution. The findings were the same as for Example 2.

What is claimed is:

1. A multilayer laminate for use as a flame barrier in an aircraft comprising
   (i) a polymeric film layer capable of withstanding a temperature of at least 200 C for at least 10 min,
   (ii) an adhesive layer having an area weight of from 2 to 40 gsm capable of activation at a temperature of from 75 to 200 degrees C.,
   (iii) an inorganic refractory layer, and
   (iv) aramid paper comprising from 50 to 90 weight percent of aramid fibers and from 10 to 50 weight percent of meta-aramid binder;
      wherein the inorganic refractory layer of (iii) comprises platelets in an amount of 100% by weight with a dry areal weight of 15 to 50 gsm and a residual moisture content of no greater than 10 percent by weight.

2. The laminate of claim 1 wherein the inorganic refractory layer comprises vermiculite.

3. The laminate of claim 1 wherein the inorganic refractory layer is perforated.

4. The laminate of claim 1 wherein the polymeric film layer is a fluoropolymer, polyimide, polyetheretherketone, or polyetherketoneketone.

5. The laminate of claim 1 wherein the polymeric film layer is metalized on at least one surface.

6. The laminate of claim 1 wherein the adhesive layer contains up to 40 weight percent of a flame retardant ingredient.

7. The laminate of claim 1 wherein the adhesion bond between inorganic refractory layer and the polymeric film is at least 0.25 lb/in.

8. The laminate of claim 7 wherein the adhesion bond between inorganic refractory layer and the polymeric film is at least 0.8 lb/in.

9. The laminate of claim 1 wherein the inorganic refractory layer has a dry areal weight of from 20 to 35 gsm.

10. The laminate of claim 1 wherein the inorganic refractory layer has a moisture content of no greater than 3%.

11. A thermal acoustic blanket for an aircraft comprising
   (i) a core of fibrous batting having first and second outer surfaces,
   (ii) a multilayer laminate covering the first outer surface of the core and partially covering the second outer surface of the core, and
   (iii) a polymeric backing film covering the portion of the second outer surface of the core not covered by the multilayer laminate, wherein,
   the polymeric backing film overlaps and is bonded to the multilayer laminate,
   the polymeric backing film can withstand a temperature of at least 200 C for at least 10 min, and
   the core has a self-extinguishing time no greater than 10 seconds and a maximum burn length of no greater than 102 mm when tested in accordance with BSS7230 Method F1,
   wherein the multilayer laminate of (ii) comprises:
(a) a polymeric film layer capable of withstanding a temperature of at least 200 C for at least 10 min,
(b) an adhesive layer having an dry areal weight of from 2 to 40 gsm capable of activation at a temperature of from 75 to 200 degrees C.,
(c) an inorganic refractory layer of platelets, and
(d) aramid paper comprising from 50 to 90 weight percent of aramid fibers and from 10 to 50 weight percent of meta-aramid binder.

* * * * *